United States Patent [19]

Sano et al.

[11] Patent Number: 5,510,305

[45] Date of Patent: Apr. 23, 1996

[54] NON-REDUCIBLE DIELECTRIC CERAMIC COMPOSITION

[75] Inventors: Harunobu Sano, Kyoto; Yukio Hamaji, Nagaokakyo, both of Japan

[73] Assignee: Murata Manufacturing Co., Ltd., Japan

[21] Appl. No.: 259,483

[22] Filed: Jun. 14, 1994

[30] Foreign Application Priority Data

Jun. 15, 1993 [JP] Japan .................................. 5-169622
Sep. 2, 1993 [JP] Japan .................................. 5-243698

[51] Int. Cl.$^6$ .................................................... C04B 35/49
[52] U.S. Cl. .................................................... 501/138; 501/139
[58] Field of Search .................................. 501/137, 138, 501/139

[56] References Cited

U.S. PATENT DOCUMENTS

| | | | |
|---|---|---|---|
| 4,115,493 | 9/1978 | Sakabe et al. | 501/137 |
| 4,987,108 | 1/1991 | Takagi et al. | 501/139 |
| 5,202,814 | 4/1993 | Kohno et al. | 501/139 |
| 5,248,640 | 9/1993 | Sano et al. | 501/139 |

FOREIGN PATENT DOCUMENTS

| | | | |
|---|---|---|---|
| 0446814 | 9/1991 | European Pat. Off. | C04B 35/49 |
| 57-42588 | 9/1982 | Japan | C04B 35/46 |
| 61-101459 | 5/1986 | Japan | C04B 35/46 |
| 4-115409 | 4/1992 | Japan | H01B 3/12 |

OTHER PUBLICATIONS

Patent Abstracts of Japan, vol. 16, No. 364 (E-1244), 6 Aug. 1992 & JP-A-04 115 409, 16 Apr. 1992.

*Primary Examiner*—Deborah Jones
*Attorney, Agent, or Firm*—Ostrolenk, Faber, Gerb & Soffen

[57] ABSTRACT

A non-reducible dielectric ceramic composition consists essentially of a main component and at least one oxide selected from the group consisting of oxides of Mn, Fe, Cr, Co and Ni. The main component has a composition of the general formula: $\{(Ba_{1-o-p-q-r}Sr_oCa_pR1_qR2_r)O_{1+q/2+r/2}\}_m(Ti_{1-x-y}Zr_xHf_y)O_2$, where R1 is at least one element selected from the group consisting of La, Ce, Nd, Pr and Sm, R2 is at least one element selected from the group consisting of Dy, Ho, Er, Yb and Y, and o, p, q, r, x, y and m meet the following conditions: $0 < o \leq 0.32$, $0 \leq p \leq 0.20$, $0 < q \leq 0.02$, $0 < r \leq 0.02$, $0 < x \leq 0.24$, $0 < y \leq 0.16$, $1.00 \leq m \leq 1.03$, and $0 < q+r \leq 0.03$. The content of additive is 0.02 to 2.0 moles per 100 moles of the main component when calculated in terms of respective oxides, MnO, $Fe_2O_3$, $Cr_2O_3$, CoO and NiO. The composition may contain MgO as a part of the main component in an amount up to 0.05 mol %.

5 Claims, No Drawings

NON-REDUCIBLE DIELECTRIC CERAMIC COMPOSITION

BACKGROUND OF THE INVENTION

1. Field of the Invention

The present invention relates to a non-reducible dielectric ceramic composition and, more particularly, to a non-reducible dielectric ceramic composition used for monolithic ceramic capacitors.

2. Description of the Prior Art

Monolithic ceramic capacitors are generally produced by first preparing dielectric ceramic green sheets with a dielectric ceramic composition such as a composition mainly comprising barium titanate, applying a conductive material for an internal electrode on one surface of each green sheet, stacking the green sheets, bonding them by thermocompression, cutting the resultant multilayered body into ceramic capacitor green chips, then firing the green chips in air at 1250°–1350° C. to form capacitor chips with internal electrodes, and finally forming external electrodes connected to the internal electrodes on opposed sides of each of the capacitor chips to complete monolithic ceramic capacitors.

Accordingly, a conductive material for internal electrodes is required to meet conditions such that (a) it has a melting point higher than a sintering temperature of the dielectric ceramics as the internal electrodes are fired along with the dielectric ceramic material; and that (b) it neither oxidize nor react with the dielectric ceramics even in an oxidizing atmosphere with a high temperature.

To meet such requirements, noble metals such as platinum, gold, palladium and their alloys have been used as a conductive material for the internal electrodes. Such noble metals provide satisfactory characteristics, but for all practical purposes they are too expensive to use. That is, use of such a noble metal is the greatest factor determining the rise in the production cost of monolithic ceramic capacitors as the cost of internal electrodes occupies from 30 to 70% of the production cost of monolithic ceramic capacitors.

Other metals having a high melting point are base metals such as Ni, Fe, Co, W and Mo, but they are easily oxidized in a oxidizing high temperature atmosphere. Thus, if such a base metal is used as a material for internal electrodes of monolithic ceramic capacitors, it loses the function serving as the internal electrodes when the green chips are fired in air. It is therefore required to fire the green chips in a neutral or reducing atmosphere in order to use a base metal as a material for internal electrodes of monolithic ceramic capacitors. However, the dielectric ceramic materials of the prior art are reduced considerably and thus semiconductorized when fired in the reducing atmosphere.

To solve such a problem, it has been proposed in JP-B-57-42588 to use a dielectric ceramic material comprising a barium titanate solid solution having a ratio of a barium site to a titanium site larger than the stoichiometric ratio. Such a dielectric ceramic material is scarcely semiconductorized even if fired in a reducing atmosphere, thus making it possible to manufacture monolithic ceramic capacitors including internal electrodes of a base metal such as nickel. It is, however, difficult with such dielectric ceramic materials to miniaturize monolithic ceramic capacitors for the following reasons.

With recent development of electronic techniques, considerable progress has made in miniaturization of electronic devices. Consequently, this requires miniaturization of monolithic ceramic capacitors as well as other electronic parts. For the monolithic ceramic capacitors, the miniaturization is generally carried out by using a dielectric ceramic material with a high dielectric constant or by making dielectric ceramic layers thin. The dielectric ceramic materials as disclosed in JP-B-57-42588 have high dielectric constant, but they are large in grain size. Thus, if the thickness of dielectric ceramic layers is decreased to 10 µm or below, the number of crystal grains present in each layer is considerably decreased, resulting in lowering of reliability of the monolithic ceramic capacitors.

On the other hand, JP-B-61-101459 discloses a nonreducible dielectric ceramic composition consisting of a barium titanate solid solution into which a rare earth element such as La, Nd, Sm and Dy has been incorporated. Such a composition has a fine grain size which enables one to avoid lowering of the reliability of monolithic ceramic capacitors as the fine grains size contributes to increase the number of crystal grains present in each dielectric layer. However, it is impossible with such a ceramic composition to obtain high dielectric constant and that the composition containing a rare earth element is easy to oxidize during firing.

SUMMARY OF THE INVENTION

It is therefore a primary object of the present invention to provide a nonreducible dielectric ceramic composition which is large in dielectric constant but small in crystal grain size and which is never semiconductorized even if fired in a reducing atmosphere.

Another object of the present invention is to provide a nonreducible dielectric ceramic composition which enables to miniaturizing monolithic ceramic capacitors without lowering of reliability and characteristics.

According to the present invention, there is provided a non-reducible dielectric ceramic composition consisting essentially of a main component and at least one additive selected from the group consisting of oxides of Mn, Fe, Cr, Co and Ni, said main component having a composition of the general formula (I):

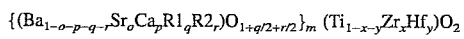

$$\{(Ba_{1-o-p-q-r}Sr_oCa_pR1_qR2_r)O_{1+q/2+r/2}\}_m (Ti_{1-x-y}Zr_xHf_y)O_2$$

where R1 is at least one element selected from the group consisting of La, Ce, Nd, Pr and Sm, R2 is at least one element selected from the group consisting of Dy, Ho, Er, Yb and Y, and o, p, q, r, x, y and m meet the following conditions: $0<o\leq0.32$, $0\leq p\leq0.20$, $0<q\leq0.02$, $0<r\leq0.02$, $0<x\leq0.24$, $0<y\leq0.16$, $1.00\leq m\leq1.03$, and $0< q+r\leq0.03$; the content of said additive being 0.02 to 2.0<moles per 100 moles of said main component when calculated in terms of respective oxides, MnO, $Fe_2O_3$, $Cr_2O_3$, CoO and NiO.

The above composition may contain at least one additional additive selected from the group consisting of $SiO_2$ and ZnO in an amount of 0.1 to 2.0 moles per 100 moles of the main component.

The above non-reducible dielectric ceramic composition has a small grain size of not more than 3 µm even though it has a high dielectric constant of not less than 11000, thus making it possible to thin the dielectric layers without causing a decrease in the number of crystal grains present in each dielectric layer. However, if the contents of R1 and R2 become increased, the dielectric loss becomes more than 1.5% and the insulation resistance becomes lowered. This problem can be solved by addition of a certain amount of MgO into the main component.

Thus, according to the present invention there is further provided a non-reducible dielectric ceramic composition consisting essentially of a main component and at least one additive selected from the group consisting of oxides of Mn, Fe, Cr, Co and Ni, said main component having a composition of the general formula (II):

$(1-a)\{(Ba_{1-o-p-q-r}Sr_oCa_pR1_qR2_r)O_{1+q/2+r/2}\}_m(Ti_{1-x-y}Zr_xHf_y)O_2 + aMgO$, where R1 is at least one element selected from the group consisting of La, Ce, Nd, Pr and Sm, R2 is at least one element selected from the group consisting of Dy, Ho, Er, Yb and Y, and a, o, p, q, r, x, y and m meet the following conditions: $0 < a \leq 0.05$, $0 < o \leq 0.32$, $0 \leq p \leq 0.20$, $0 < q \leq 0.02$, $0 < r \leq 0.03$, $0 < x \leq 0.24$, $0 < y \leq 0.16$, $1.00 \leq m \leq 1.03$, and $0 < q+r \leq 0.04$; the content of said additive being 0.02 to 2.0 moles per 100 moles of said main component when calculated in terms of respective oxides, MnO, $Fe_2O_3$, $Cr_2O_3$, CoO and NiO.

Also, the composition may contains at least one additional additive selected from the group consisting of $SiO_2$ and ZnO in an amount of 0.1 to 2.0 moles per 100 moles of the main component.

The dielectric ceramic composition of the present invention is never reduced or semiconductorized even if fired in a reducing atmosphere. Furthermore, the dielectric ceramic composition of the present invention can be fired at a temperature of not more than 1300° C. Accordingly, the non-reducible dielectric ceramic composition of the present invention makes it possible to use any base metal as a material for internal electrodes of monolithic ceramic capacitors, which in turn makes it possible to cut down the production cost of monolithic ceramic capacitors.

The non-reducible dielectric ceramic composition of the present invention has a small grain size of not more than 3 μm though it has a high dielectric constant of not less than 9000, thus making it possible to thin the dielectric layers without causing a decrease in the number of crystal grains present in each dielectric layer. Thus, the present invention makes it possible to manufacture monolithic ceramic capacitors which have high reliability and which are small in size but large in capacitance.

The above and other objects, features and advantages of the present invention will become apparent from the following examples.

EXAMPLE 1

Using, as raw materials, $BaCO_3$, $SrCO_3$, $CaCO_3$, $CeO_2$, $La_2O_3$, $Nd_2O_3$, $Dy_2O_3$, $Ho_2O_3$, $Er_2O_3$, $Yb_2O_3$, $Y_2O_3$, $TiO_2$, $ZrO_2$, $HFO_2$, MnO, $Fe_2O_3$, $Cr_2O_3$, CoO and NiO with the purity of not less than 99.8%, there were prepared specimens of dielectric ceramic compositions in the following manner:

Firstly, the raw materials, $BaCO_3$, $SrCO_3$, $CaCO_3$, $CeO_2$, $La_2O_3$, $Nd_2O_3$, $Dy_2O_3$, $Ho_2O_3$, $Er_2O_3$, $Yb_2O_3$, $Y_2O_3$, $TiO_2$, $ZrO_2$ and $HfO_2$, were weighed and mixed to prepare a mixture for a main component having a composition expressed by the general formula (I):

$\{(Ba_{1-o-p-q-r}Sr_oCa_pR1_qR2_r)O_{1+q/2+r/2}\}_m(Ti_{1-x-y}Zr_xHf_y)O_2$ with values of o, p, q, r, m, x and y shown in Table 1. The remaining raw materials, MnO, $Fe_2O_3$, $Cr_2O_3$, CoO and NiO, were added as an additive to the resultant mixture in proportions shown in Table 1 in which the added amounts of the additive are listed in mole per 100 moles of the main component, respectively.

The resultant mixture was wet-milled with a ball mill for 16 hours, dried by evaporation, calcined in air at 1100° C. for 2 hours, and then crushed and pulverized by a dry grinding machine to prepare a calcined powder with a particle size of 1 μm or smaller.

The calcined powder was added with suitable amounts of pure water and an organic binder of polyvinyl acetate, and wet-milled for 16 hours with a ball mill and then granulated to prepare molding powder. The powder was then molded under a pressure of 2000 Kg/cm² to prepare green compacts of a diameter of 10 mm and a thickness of 0.5 mm. The green compacts were heated to 500° C. in air to remove the organic binder by combustion, and then fired at a temperature shown in Table 2 for 2 hours in a reducing atmosphere consisting of $H_2$, $N_2$ and air with a partial pressure of oxygen being $2 \times 10^{-10}$ to $3 \times 10^{-12}$ atm to prepare ceramic disks.

The resultant ceramic disks were observed by a scanning-electron microscope at a magnification of 1500 to determine crystal gain size.

Each ceramic disk was provided on its opposite sides with silver electrodes by applying a silver paste and then baking it at 600° C. for 30 minutes in a nitrogen atmosphere to prepare a capacitor to be used as a specimen for measurements of electrical properties.

For each specimen, measurements were made on dielectric constant ($\epsilon$), dielectric loss (tan $\delta$), and a temperature coefficient (TC) of capacitance (C), and insulation resistance. The dielectric constant and dielectric loss were measured at 1 kHz, 1 Vrms at 25° C. The temperature coefficient (TC) of capacitance was determined over the temperature range of −25° C. to 85° C. on the basis of the capacitance at 20° C. along with the largest absolute value of TC in the range of −25° C. to 85° C. The temperature coefficient (TC) of capacitance was given by equation: $TC = \Delta C / C_{20}$, where $\Delta C$ is difference between capacitance at the measured temperature and that at 20° C., and $C_{20}$ is a capacitance at 20° C.

The insulation resistance was measured at 25° C. and 85° C. after applying ;a direct voltage of 500 V to the specimen for 2 minutes. The results are shown in Table 2 in which the insulation resistance is given as a logarithmic value of volume resistance (log ρ).

In Table 1 and Table 2, specimens with an asterisk are those having a composition out of the scope of the present invention.

TABLE 1

| | Main component $\{(Ba_{1-o-p-q-r}Sr_oCa_pR1_qR2_r)O_{1+q/2+r/2}\}_m(Ti_{1-x-y}Zr_xHf_y)O_2$ | | | | | | | | Additive (mol) | | | | |
|---|---|---|---|---|---|---|---|---|---|---|---|---|---|
| No. | o | p | q | r | q + r | m | x | y | MnO | $Fe_2O_3$ | $Cr_2O_3$ | CoO | NiO |
| *1 | 0 | 0.05 | Ce:0.005 | Y:0.0075 | 0.0125 | 1.007 | 0.06 | 0.02 | 0.3 | — | — | — | — |
| *2 | 0.15 | 0.08 | — | Y:0.005 | 0.005 | 1.007 | 0.09 | 0.01 | 0.3 | — | — | — | 0.2 |
| *3 | 0.08 | 0.05 | Ce:0.005 | — | 0.005 | 1.007 | 0.06 | 0.02 | 0.3 | — | — | — | 0.1 |
| *4 | 0.18 | 0.03 | Ce:0.005 | Y:0.0075 | 0.0125 | 1.005 | 0 | 0.03 | 0.3 | — | — | — | 0.1 |

TABLE 1-continued

| | Main component $\{(Ba_{1-o-p-q-r}Sr_oCa_pR1_qR2_r)O_{1+q/2+r/2}\}_m(Ti_{1-x-y}Zr_xHf_y)O_2$ | | | | | | | Additive (mol) | | | | |
|---|---|---|---|---|---|---|---|---|---|---|---|---|
| No. | o | p | q | r | q + r | m | x | y | MnO | $Fe_2O_3$ | $Cr_2O_3$ | CoO | NiO |
| *5 | 0.10 | 0.10 | Ce:0.005 | Y:0.0075 | 0.0125 | 1.005 | 0.08 | 0 | 0.3 | — | — | — | — |
| *6 | 0.06 | 0.03 | Ce:0.005 | Y:0.0075 | 0.0125 | 1.005 | 0.10 | 0.02 | — | — | — | — | — |
| *7 | 0.06 | 0.03 | Ce:0.005 | Y:0.0075 | 0.0125 | 0.995 | 0.10 | 0.02 | 0.3 | — | — | — | 0.1 |
| 8 | 0.01 | 0.03 | Ce:0.005 | Y:0.0075 | 0.0125 | 1.007 | 0.13 | 0.005 | 0.3 | — | — | — | 0.2 |
| 9 | 0.01 | 0 | La:0.001 Nd:0.003 | Y:0.008 | 0.012 | 1.01 | 0.12 | 0.01 | 0.4 | — | — | — | 0.1 |
| 10 | 0.08 | 0.02 | Ce:0.005 | Dy:0.007 | 0.012 | 1.007 | 0.11 | 0.01 | 0.3 | — | 0.1 | — | 0.2 |
| 11 | 0.14 | 0.02 | Ce:0.001 | Dy:0.01 Er:0.005 Y:0.005 | 0.021 | 1.01 | 0.04 | 0.05 | 0.3 | — | — | — | 0.2 |
| 12 | 0.32 | 0.05 | Ce:0.0025 | Er:0.01 | 0.0125 | 1.007 | 0.05 | 0.005 | 0.3 | 0.1 | — | — | 0.2 |
| 13 | 0.05 | 0.20 | Ce:0.004 | Ho:0.002 Yb:0.006 | 0.012 | 1.01 | 0.01 | 0.16 | 0.02 | — | — | — | — |
| 14 | 0.04 | 0.10 | La:0.005 Ce:0.01 Nd:0.005 | Y:0.01 | 0.03 | 1.03 | 0.07 | 0.01 | 1.0 | 0.2 | — | 0.4 | 0.4 |
| 15 | 0.06 | 0.02 | Ce:0.005 | Y:0.007 | 0.012 | 1.01 | 0.13 | 0.01 | 0.3 | — | — | — | 0.1 |
| 16 | 0.03 | 0.02 | Ce:0.001 | Y:0.001 | 0.002 | 1.00 | 0.24 | 0.001 | 0.3 | — | — | — | — |
| 17 | 0.01 | 0 | Ce:0.0025 | Y:0.005 | 0.0075 | 1.015 | 0.15 | 0.001 | 0.4 | — | — | 0.05 | 0.05 |
| *18 | 0.38 | 0.01 | Ce:0.005 | Y:0.007 | 0.012 | 1.005 | 0.14 | 0.01 | 0.3 | — | — | — | 0.1 |
| *19 | 0.03 | 0.25 | Ce:0.002 | Y:0.005 | 0.007 | 1.005 | 0.15 | 0.005 | 0.3 | — | — | — | 0.1 |
| *20 | 0.06 | 0.02 | Ce:0.025 | Dy:0.003 | 0.028 | 1.005 | 0.12 | 0.01 | 0.3 | — | — | — | 0.1 |
| *21 | 0.06 | 0.02 | Ce:0.005 | Y:0.025 | 0.03 | 1.005 | 0.12 | 0.01 | 0.3 | — | — | — | 0.1 |
| *22 | 0.06 | 0.02 | Ce:0.02 | Y:0.02 | 0.04 | 1.007 | 0.12 | 0.01 | 0.3 | — | — | — | — |
| *23 | 0.06 | 0.02 | Ce:0.005 | Y:0.005 | 0.01 | 1.007 | 0.30 | 0.005 | 0.3 | — | — | — | — |
| *24 | 0.06 | 0.02 | Ce:0.005 | Y:0.005 | 0.01 | 1.007 | 0.05 | 0.20 | 0.3 | — | — | — | — |
| *25 | 0.06 | 0.02 | Ce:0.005 | Y:0.007 | 0.012 | 1.007 | 0.13 | 0.01 | 3.0 | — | — | — | 0.1 |
| *26 | 0.06 | 0.02 | Ce:0.005 | Y:0.007 | 0.012 | 1.05 | 0.13 | 0.01 | 0.3 | — | — | — | 0.1 |

TABLE 2

| No | firing temp. (°C.) | ε | tan δ (%) | TC of capacitance $\Delta C/C_{20}$ (%) | | | Volume resistance log ρ (Ω · cm) | | grain size (μm) |
|---|---|---|---|---|---|---|---|---|---|
| | | | | −25° C. | 85° C. | $|\Delta C/C_{20}|_{max}$ | 25° C. | 85° C. | |
| *1 | 1280 | 5800 | 2.5 | −51 | 15 | 96 | 13.0 | 12.7 | 2.0 |
| *2 | 1280 | 11200 | 1.2 | −70 | −65 | 70 | 13.2 | 12.7 | 4.0 |
| *3 | 1280 | 7300 | 2.1 | −62 | −10 | 81 | 13.0 | 12.9 | 2.7 |
| *4 | 1280 | 7000 | 1.6 | −67 | 30 | 120 | 12.9 | 12.8 | 2.5 |
| *5 | 1280 | 6500 | 1.8 | −63 | −15 | 73 | 13.1 | 13.0 | 2.5 |
| *6 | 1280 | 12100 | 1.2 | −70 | −73 | 73 | 12.0 | 8.2 | 2.2 |
| *7 | 1280 | | | Unmeasurable | | | 6.1 | 5.5 | 2.7 |
| 8 | 1280 | 12200 | 1.3 | −74 | −67 | 74 | 13.0 | 12.8 | 2.0 |
| 9 | 1260 | 13300 | 1.1 | −72 | −70 | 72 | 13.1 | 12.8 | 2.2 |
| 10 | 1280 | 13600 | 0.6 | −70 | −73 | 73 | 13.0 | 12.9 | 2.5 |
| 11 | 1280 | 12400 | 0.4 | −73 | −65 | 73 | 12.9 | 12.7 | 2.5 |
| 12 | 1280 | 12900 | 0.4 | −71 | −74 | 74 | 13.0 | 12.9 | 2.7 |
| 13 | 1300 | 11300 | 0.7 | −58 | −42 | 58 | 13.0 | 12.4 | 2.0 |
| 14 | 1280 | 12300 | 1.5 | −76 | −72 | 76 | 12.6 | 12.1 | 2.0 |
| 15 | 1260 | 13700 | 0.9 | −72 | −75 | 75 | 13.1 | 13.0 | 2.2 |
| 16 | 1300 | 11100 | 0.2 | −47 | −65 | 65 | 13.2 | 12.9 | 3.0 |
| 17 | 1280 | 11700 | 0.4 | −70 | −73 | 73 | 13.1 | 13.0 | 3.0 |
| *18 | 1280 | 6700 | 0.1 | 32 | 70 | 70 | 13.3 | 13.0 | 3.0 |
| *19 | 1340 | 5500 | 0.5 | −37 | −46 | 46 | 13.3 | 13.1 | 3.0 |
| *20 | 1280 | 15100 | 3.1 | −59 | −70 | 70 | 8.2 | 7.0 | 2.0 |
| *21 | 1280 | 11500 | 2.3 | −53 | −73 | 73 | 9.2 | 7.5 | 2.5 |
| *22 | 1280 | | | Unmeasurable | | | 6.0 | 5.6 | 2.0 |
| *23 | 1340 | 4300 | 0.08 | 10 | −59 | 59 | 13.0 | 12.8 | 2.5 |
| *24 | 1280 | 16000 | 0.3 | −71 | −82 | 82 | 13.0 | 12.7 | 3.0 |
| *25 | 1280 | 12800 | 2.3 | −70 | −75 | 75 | 11.5 | 8.0 | 3.5 |
| *26 | | | | Insufficiently sintered | | | | | 0.2 |

As can be seen from the above results, the non-reducible dielectric ceramic composition of the present invention possesses a high dielectric constant equal to or more than 11000, a low loss tangent of equal to or less than 2.0%, and good temperature coefficient of capacitance which meets requirements of F characteristics defined by Japanese Industrial Standard (JIS) in the temperature range of −25° C. to +85° C.

In addition, the composition of the present invention possesses a high value of the insulation resistance of which a logalithimic value is equal to or more than 12. Further, the composition can be sintered at a relatively low temperature of not more than 1300° C. and has a small grain size of 3 μm or below which makes it possible to thin the dielectric layers of the monolithic ceramic capacitors.

The main component of the non-reducible dielectric ceramic composition has been limited to those having a composition expressed by the general formula (I) for the following reasons:

If the molar fraction of Sr, o, is 0, like specimen No. 1, the dielectric constant becomes less than 11000, the dielectric loss exceeds 2.0% and the temperature coefficient of capacitance becomes large. If o exceeds 0.32, like specimen No. 18, the dielectric constant becomes less than 11000 and the temperature coefficient of capacitance becomes large and does not meet the requirements of F characteristics defined by JIS.

If the molar fraction of Ca, p, exceeds 0.20, like specimen No. 19, the sintering properties of the dielectric ceramic composition become worse.

If the molar fraction of R1, q, is 0, like specimen No. 2, the crystal grain size exceeds 3 μm, which in turn makes it impossible to thin the dielectric layers for monolithic ceramic capacitors. If q exceeds 0.02, like specimen No. 20, the dielectric loss exceeds 2.0% and the insulation resistance at 25° C. or 85° C. becomes lowered.

If the molar fraction of R2, r, is 0, like specimen No. 3, the dielectric constant becomes less than 11000 and the temperature coefficient of capacitance becomes large. If r exceeds 0.02, like specimen No. 21, the dielectric loss exceeds 2.0% and the insulation resistance becomes lowered.

If the sum of the molar fractions of R1 and R2, i.e., q+r, exceeds 0.03, like specimen No. 22, the composition is reduced and semiconductorized when fired in a reducing atmosphere, whereby the insulation resistance becomes considerably lowered.

If the molar fraction of Zr, x, is 0, like specimen No. 4, the dielectric constant becomes less than 11000 and the temperature coefficient of capacitance becomes large. If x exceeds 0.24, like specimen No. 23, the sintering properties become lowered and the dielectric constant becomes less than 11000.

If the molar fraction of Hf, y, is 0 like specimen No. 5, the dielectric constant becomes less than 11000. if y exceeds 0.16, like specimen No. 24, the temperature coefficient of capacitance does not meet the requirements of F characteristics defined by JIS.

If the molar ratio of $\{(Ba_{1-o-p-q-r}Sr_oCa_pR1_qR2_r)O_{+q/2+r/2}\}$ to $(Ti_{1-x-y}Zr_xHf_y)O_2$, i.e., m, is less than 1.00 like specimen No. 7, the insulation resistance becomes lowered as the composition is reduced and semiconductorized when fired in a reducing atmosphere. On the other hand, if m exceeds 1.03, like specimen No. 26, the sintering properties becomes considerably lowered. Thus, the molar ratio of the barium site to titanium site has been limited to a value ranging from 1.000 to 1.03.

Further, if the added amount of the additive, MnO, $Fe_2O_3$, $Cr_2O_3$, CoO and NiO, is less than 0.02 mole per 100 mole of the main component, like specimen No. 6, the insulation resistance at 85° C. and above becomes small, resulting in lowering of the reliability in a long use at high temperatures. If the added amount of the above additive exceeds 2.0 moles per 100 mole of the main component, like specimen No. 25, the dielectric loss exceeds 2.0% and the insulation resistance becomes lowered. For these reasons, the added amount of the additive has been limited to a value ranging from 0.02 to 2.0 moles per 100 moles of the main component.

EXAMPLE 2

Using calcined powders of specimen Nos. 2, 3, 15 and 17 prepared in Example 1 for and having particle size of not more than 1 μm, there were prepared monolithic ceramic capacitors in the following manner.

Separate from the above, using, as raw materials, $BaCO_3$, $SrCO_3$, $CaCO_3$, $TiO_2$, $ZrO_2$, $HfO_2$, MnO and NiO with the purity of not less than 99.8%, there was prepared a calcined powder for comparative specimen No. 27 in the following manner: The raw materials were weighed and mixed so that the resultant product has a composition of 100 mol $\{(Ba_{0.92}Sr_{0.06}Ca_{0.02})O\}_{1.01}(Ti_{0.83}Zr_{0.16}Hf_{0.01})O_2+0.3$ mol MnO+ 0.1 mol NiO. The resultant mixture of the raw materials was wet-milled with a ball mill for 16 hours, dried by evaporation, calcined in air at 1100° C. for 2 hours, and then crushed and pulverized by a dry grinding machine to prepare a calcined powder with a particle size of 1 μm or below.

Each calcined powder was wet-milled with a ball mill for 16 hours together with a suitable amount of polyvinyl butyral resin dissolved in ethyl alcohol to prepare a ceramic slurry. Then, the slurry was formed into a sheet by the Doctor blade process, dried and then cut to prepare ceramic green sheets with a thickness of 18 μm.

A conductive paste containing Ni as a conductive material was screen-printed on one surface of each ceramic green sheet to form a conductive paste layer for internal electrodes. Subsequently, 19 sheets of the resultant printed green sheets were stacked, bonded by thermocompression along with two non-printed green sheets put on the opposite surfaces of the stack, and then cut into pieces to form green chips for monolithic ceramic capacitors. The green chips were fired with an electric furnace at 350° C. in a nitrogen atmosphere to burn the binder, and then fired at a temperature shown in Table 3 for 2 hours in a reducing atmosphere composed of a mixed gas of $N_2$, $H_2$ and air with a partial pressure of oxygen being $2\times10^{-10}$ to $3\times10^{-12}$ atm to prepare monolithic ceramic capacitor chips.

The resultant capacitor chips were observed by a scanning-electron microscope at a magnification of 1500 to determine crystal gain size.

The capacitor chips were provided on its opposite sides with external electrodes connected to internal electrodes by applying a silver paste and then baking it at 600° C. for 30 minutes in a nitrogen atmosphere to produce a monolithic ceramic capacitor.

The thus prepared monolithic ceramic capacitors have the following dimensions and constituents:

Width: 1.6 mm

Length: 3.2 mm

Thickness: 1.2 mm

Thickness of each dielectric layer: 15 μm.

Number of effective dielectric layers: 19 sheets

Surface area of internal electrode: 2.1 mm$^2$

Dielectric constant ($\epsilon$) and dielectric loss (tan δ) were measured at 1 kHz, 1 Vrms at 25° C. The insulation resistance (R) was measured at 25° C. and 85° C. after applying a direct voltage of 16 V to the specimen for 2 minutes. The results are shown in Table 3 in which the insulation resistance is given as the product of insulation resistance and capacitance (CR).

The temperature coefficient (TC) of capacitance was determined over the temperature range of −25° C. to 85° C. on the basis of the capacitance at 20° C. along with the largest absolute value of TC in the range of −25° C. to 85° C. The temperature coefficient (TC) of capacitance was given by equation: TC=ΔC/C$_{20}$, where ΔC is difference between capacitance at the measured temperature and that at 20° C., and C$_{20}$ is a capacitance at 20° C.

A high temperature load life test was carried out by applying DC voltage of 150 volts to the specimen at 150° C. The specimen, i.e., a capacitor, was considered to have failed when the insulation resistance fell below $10^6$ Ω. The high temperature load life time is given as a mean value of data for 36 chips.

The capacitance of each specimen was measured before and after a high temperature load test which was carried out by applying a DC voltage of 32 volts to the specimen at 85° C. for 1000 hours. From the data, a change rate of capacitance was determined by the equation: $(\Delta C_t/C_0) \times 100$, where $\Delta C/=C_{1000}-C_0$, $C_{1000}$ is a capacitance measured after the test, $C_0$ is a capacitance measured before the test.

TABLE 3

| No. | Firing temp. (°C.) | ε | tan δ (%) | ΔC/C₂₀ °C. (%) −25° C. | 85° C. | CR (MΩ · μF) 25° C. | 85° C. | mean life time (h) | ΔC'/C₀ (%) | grain size (μm) |
|---|---|---|---|---|---|---|---|---|---|---|
| *2 | 1270 | 16500 | 3.9 | −58 | −76 | 20,600 | 11,100 | 38 | −4 | 3.7 |
| *3 | 1270 | 10800 | 8.7 | −50 | −62 | 18,900 | 10,700 | 140 | −17 | 2.4 |
| 15 | 1270 | 17200 | 3.7 | −55 | −78 | 29,700 | 15,800 | 172 | −4 | 2.8 |
| 17 | 1270 | 15800 | 3.3 | −44 | −77 | 21,300 | 14,400 | 147 | −3 | 3.0 |
| *27 | 1270 | 15100 | 4.0 | −41 | −80 | 19,300 | 12,000 | 6 | −20 | 4.2 |

As can be seen from the results shown in Table 3, the monolithic ceramic capacitors including the non-reducible dielectric ceramic composition of the present invention are high in dielectric constant, small in dielectric loss (tan δ) and possess good temperature characteristics as the temperature coefficient of capacitance ($\Delta C/C_{20}$) meets requirements of F characteristics defined by JIS in the temperature range of −25° C. to +85° C. In addition, the composition of the present invention has an high insulation resistance as the product of C and R is more than 10000 MΩ.μF at 25° C. and more than 5000 MΩ.μF at 85° C. Further, the composition has a long high temperature life time of more than 100 hours and the change rate of capacitance under the high temperature load test is less than 10%.

In contrast therewith, the specimen No. 2 containing no element R1 selected from the group consisting of La, Ce, Nd is short in high temperature life time. The specimen No. 3 containing no element R2 selected from the group consisting of Dy, Ho, Er, Yb and Y is low in dielectric constant, but large in dielectric loss. In addition, the change rate of capacitance become large when the capacitor is subjected to the high temperature load test for 1000 hours.

The specimen containing no element of R1 and R2 is short in high temperature life time, but large in change rate of capacitance. Thus, it can be seen that the co-addition of R1 and R2 contributes to improve both the high temperature life time and the change rate of capacitance due to aging during load life test.

EXAMPLE 3

Using, as raw materials, $BaCO_3$, $SrCO_3$, $CaCO_3$, $CeO_2$, $La_2O_3$, $Nd_2O_3$, $Pr_6O_{11}$, $Sm_2O_3$, $Dy_2O_3$, $Ho_2O_3$, $Er_2O_3$, $Yb_2O_3$, $Y_2O_3$, $TiO_2$, $ZrO_2$, $HfO_2$, MgO, MnO, $Fe_2O_3$, $Cr_2O_3$, CoO and NiO with the purity of not less than 99.8%, there were prepared specimens of dielectric ceramic compositions in the following manner:

The raw materials, $BaCO_3$, $SrCO_3$, $CaCO_3$, $CeO_2$, $La_2O_3$, $Nd_2O_3$, $Pr_6O_{11}$, $Sm_2O_3$, $Dy_2O_3$, $Ho_2O_3$, $Er_2O_3$, $Yb_2O_3$, $Y_2O_3$, $TiO_2$, $ZrO_2$ and $HfO_2$, were weighed and mixed to prepare a mixture for a basic composition for a main component, of the formula (III):

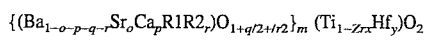

$$\{(Ba_{1-o-p-q-r}Sr_oCa_pR1R2_r)O_{1+q/2+r/2}\}_m (Ti_{1-z-x}Zr_xHf_y)O_2$$

with a set of o, p, q, r, m, x and y shown in Table 4.

The resultant mixture of the raw materials was wet-milled with a ball mill for 16 hours, dried by evaporation, calcined in air at 1100° C. for 2 hours, and then pulverized by a dry grinding machine to prepare a calcined powder with a particle size of 1 μm or below.

Added to 100 moles of the calcined power was the remaining raw materials MgO, MnO, $Fe_2O_3$, $Cr_2O_3$, CoO and NiO. The added amounts of additives are shown in Table 5. Then, the resultant mixture was added with suitable amounts of pure water and an organic binder of polyvinyl acetate, wet-milled for 16 hours with a ball mill and then granulated to prepare molding powder. The powder was then molded under a pressure of 2000 Kg/cm² to prepare green compacts of a diameter of 10 mm and a thickness of 0.5 mm. The green compacts were heated to 500° C. in air to remove the organic binder by combustion, and then fired at a temperature shown in Table 6 for 2 hours in a reducing atmosphere consisting of $H_2$, $N_2$ and air with a partial pressure of oxygen being $2 \times 10^{-10}$ to $3 \times 10^{-12}$ atm to prepare ceramic disks.

The resultant ceramic disks were observed by a scanning-electron microscope at a magnification of 1500 to determine crystal gain size.

Each ceramic disk was provided on its opposite sides with silver electrodes by applying a silver paste and then baking it at 600° C. for 30 minutes in a nitrogen atmosphere to prepare a capacitor to be used as a specimen for measurements of electrical properties.

For each specimen, measurements were made on dielectric constant (ε), dielectric loss (tan δ), and a temperature coefficient (TC) of capacitance (C), and insulation resistance. The dielectric constant and dielectric loss were measured at 1 kHz, 1 Vrms at 25° C. The temperature coefficient (TC) of capacitance was determined over the temperature range of −25° C. to 85° C. on the basis of the capacitance at 20° C. along with the largest absolute value of TC in the range of −25° C. to 85° C. The temperature coefficient (TC) of capacitance was given by equation: $TC=\Delta C/C_{20}$, where $\Delta C$ is difference between capacitance at the measured temperature and that at 20° C., and $C_{20}$ is a capacitance at 20° C.

The insulation resistance was measured at 25° C. and 85° C. after applying a direct voltage of 500 V to the specimen for 2 minutes. The results are shown in Table 6 in which the insulation resistance is given as a logalithimic value of volume resistance (log δ).

TABLE 4

Basic composition for main component
$\{(Ba_{1-o-p-q-r}Sr_oCa_pR1_qR2_r)O_{1+q/2+r/2}\}_m(Ti_{1-x-y}Zr_xHf_y)O_2$

| No. | o | p | q | r | q + r | m | x | y |
|---|---|---|---|---|---|---|---|---|
| *28 | 0 | 0.02 | Ce:0.005 | Dy:0.0075 | 0.0125 | 1.005 | 0.06 | 0.02 |
| *29 | 0.15 | 0.02 | — | Dy:0.005 | 0.005 | 1.003 | 0.11 | 0.01 |
| *30 | 0.08 | 0.05 | Ce:0.005 | — | 0.005 | 1.003 | 0.06 | 0.02 |
| *31 | 0.18 | 0.02 | Ce:0.005 | Dy:0.005 | 0.010 | 1.003 | 0 | 0.03 |
| *32 | 0.10 | 0.10 | Ce:0.005 | Dy:0.075 | 0.0125 | 1.003 | 0.08 | 0 |
| *33 | 0.05 | 0.02 | Ce:0.005 | Dy:0.030 | 0.035 | 1.003 | 0.05 | 0.005 |
| *34 | 0.05 | 0.02 | Ce:0.005 | Dy:0.005 | 0.010 | 1.005 | 0.12 | 0.02 |
| *35 | 0.05 | 0.02 | Ce:0.005 | Dy:0.005 | 0.010 | 0.99 | 0.12 | 0.02 |
| 36 | 0.05 | 0.02 | Ce:0.005 | Dy:0.003 | 0.008 | 1.004 | 0.14 | 0.005 |
| 37 | 0.005 | 0 | Ce:0.001 | Dy:0.001 | 0.002 | 1.00 | 0.24 | 0.001 |
| 38 | 0.15 | 0.05 | Sm:0.002 | Yb:0.006 | 0.008 | 1.003 | 0.11 | 0.005 |
| 39 | 0.32 | 0.01 | La:0.001 | Y:0.03 | 0.031 | 1.003 | 0.05 | 0.001 |
| 40 | 0.01 | 0.10 | La:0.002 | Dy:0.003 Ho:0.002 | 0.007 | 1.004 | 0.12 | 0.005 |
| 41 | 0.01 | 0.20 | Nd:0.002 | Yb:0.002 | 0.004 | 1.004 | 0.01 | 0.16 |
| 42 | 0.002 | 0.08 | La:0.01 Nd:0.006 Pr:0.004 | Er:0.02 | 0.04 | 1.03 | 0.05 | 0.005 |
| 43 | 0.03 | 0.02 | Ce:0.01 | Y:0.01 | 0.02 | 1.002 | 0.05 | 0.07 |
| 44 | 0.01 | 0 | Sm:0.005 | Er:0.005 | 0.01 | 1.003 | 0.17 | 0.01 |
| *45 | 0.38 | 0.01 | Ce:0.005 | Dy:0.005 | 0.01 | 1.003 | 0.13 | 0.02 |
| *46 | 0.03 | 0.25 | Ce:0.025 | Dy:0.008 | 0.01 | 1.005 | 0.12 | 0.01 |
| *47 | 0.05 | 0.02 | Ce:0.025 | Er:0.01 | 0.035 | 1.003 | 0.13 | 0.01 |
| *48 | 0.05 | 0.02 | Ce:0.005 | Dy:0.035 | 0.04 | 1.003 | 0.13 | 0.01 |
| *49 | 0.05 | 0.02 | Ce:0.02 | Dy:0.03 | 0.05 | 1.003 | 0.13 | 0.01 |
| *50 | 0.05 | 0.02 | Ce:0.005 | Dy:0.005 | 0.01 | 1.003 | 0.30 | 0.005 |
| *51 | 0.05 | 0.02 | Ce:0.005 | Dy:0.005 | 0.01 | 1.003 | 0.05 | 0.20 |
| *52 | 0.05 | 0.02 | Ce:0.005 | Dy:0.005 | 0.01 | 1.003 | 0.13 | 0.01 |
| *53 | 0.05 | 0.02 | Ce:0.005 | Dy:0.005 | 0.01 | 1.003 | 0.12 | 0.01 |
| *54 | 0.05 | 0.02 | Ce:0.005 | Dy:0.005 | 0.01 | 1.05 | 0.13 | 0.01 |

TABLE 5

| No. | a | MnO | $Fe_2O_3$ | $Cr_2O_3$ | CoO | NiO |
|---|---|---|---|---|---|---|
| *28 | 0.005 | 0.4 | — | — | — | — |
| *29 | 0.005 | 0.4 | — | — | — | — |
| *30 | 0.005 | 0.3 | — | — | 0.1 | — |
| *31 | 0.01 | 0.4 | — | — | — | — |
| *32 | 0.01 | 0.3 | — | — | 0.1 | — |
| *33 | 0 | 0.3 | — | — | 0.1 | — |
| *34 | 0.005 | — | — | — | — | — |
| *35 | 0.005 | 0.4 | — | — | — | — |
| 36 | 0.005 | 0.4 | — | — | — | 0.1 |
| 37 | 0.005 | 0.3 | — | — | — | — |
| 38 | 0.005 | 0.3 | — | — | — | 0.2 |
| 39 | 0.005 | 0.3 | — | — | — | — |
| 40 | 0.02 | 0.4 | — | — | — | — |
| 41 | 0.001 | 0.02 | — | — | — | — |
| 42 | 0.01 | 1.0 | 0.1 | — | 0.7 | 0.2 |
| 43 | 0.05 | 0.2 | — | — | 0.1 | — |
| 44 | 0.005 | 0.3 | — | — | — | — |
| *45 | 0.005 | 0.3 | — | — | 0.1 | — |
| *46 | 0.005 | 0.3 | — | — | 0.1 | — |
| *47 | 0.005 | 0.3 | — | — | 0.1 | — |
| *48 | 0.005 | 0.3 | — | — | 0.1 | — |
| *49 | 0.005 | 0.3 | — | — | — | 0.1 |
| *50 | 0.005 | 0.3 | — | — | — | — |
| *51 | 0.005 | 0.3 | — | — | — | — |
| *52 | 0.08 | 0.3 | — | — | — | 0.1 |
| *53 | 0.005 | 3.0 | — | — | 0.1 | — |
| *54 | 0.005 | 0.3 | — | — | 0.1 | — |

TABLE 6

| No | firing temp. (°C.) | ε | tan δ (%) | TC of capacitance ΔC/C$_{20}$ (%) −25° C. | 85° C. | \|ΔC/C$_{20}$\|$_{max}$ | log ρ (Ω · cm) 25° C. | 85° C. | grain size (μm) |
|---|---|---|---|---|---|---|---|---|---|
| *28 | 1280 | 5800 | 2.3 | −47 | 17 | 83 | 13.1 | 12.7 | 2.5 |
| *29 | 1280 | 10800 | 1.5 | −69 | −64 | 69 | 13.3 | 12.7 | 4.2 |
| *30 | 1280 | 6900 | 1.9 | −60 | −15 | 83 | 13.0 | 12.9 | 2.2 |
| *31 | 1280 | 6600 | 1.5 | −63 | 17 | 95 | 13.0 | 12.8 | 2.2 |
| *32 | 1280 | 5900 | 1.8 | −58 | −10 | 68 | 13.1 | 13.0 | 2.5 |
| *33 | 1280 | 14300 | 2.9 | −75 | −64 | 75 | 9.7 | 7.8 | 2.5 |
| *34 | 1300 | 11700 | 1.4 | −72 | −67 | 72 | 12.1 | 8.5 | 2.2 |
| 35 | 1280 | | | Unmeasurable | | | | | 3.0 |
| 36 | 1280 | 13300 | 0.8 | −67 | −73 | 73 | 13.2 | 13.0 | 2.5 |

TABLE 6-continued

| No | firing temp. (°C.) | $\epsilon$ | tan δ (%) | TC of capacitance $\Delta C/C_{20}$ (%) -25° C. | 85° C. | $|\Delta C/C_{20}|_{max}$ | log ρ (Ω · cm) 25° C. | 85° C. | grain size (μm) |
|---|---|---|---|---|---|---|---|---|---|
| 37 | 1280 | 9700 | 0.4 | −38 | −54 | 54 | 13.2 | 12.8 | 3.0 |
| 38 | 1280 | 12500 | 0.8 | −71 | −65 | 71 | 13.0 | 13.0 | 2.5 |
| 39 | 1300 | 13000 | 1.0 | −70 | −73 | 73 | 13.0 | 12.9 | 2.5 |
| 40 | 1280 | 9200 | 0.6 | −42 | −52 | 52 | 13.3 | 13.1 | 2.5 |
| 41 | 1300 | 11000 | 0.7 | −57 | −40 | 57 | 13.1 | 13.0 | 2.0 |
| 42 | 1300 | 11400 | 1.4 | −60 | −68 | 68 | 12.6 | 12.4 | 2.2 |
| 43 | 1280 | 10100 | 0.6 | −57 | −65 | 65 | 13.0 | 12.9 | 2.0 |
| 44 | 1260 | 15700 | 0.7 | −65 | −74 | 74 | 13.2 | 13.0 | 3.0 |
| *45 | 1280 | 4900 | 0.09 | 41 | −59 | 59 | 13.0 | 12.8 | 3.0 |
| *46 | 1350 | 5100 | 0.6 | −12 | −48 | 48 | 13.1 | 12.8 | 3.0 |
| *47 | 1280 | 14500 | 3.0 | −45 | −70 | 70 | 9.0 | 7.7 | 2.0 |
| *48 | 1280 | 12600 | 2.4 | −40 | −71 | 71 | 10.1 | 7.7 | 2.5 |
| *49 | 1280 | | | | Unmeasurable | | | | 2.2 |
| *50 | 1350 | 3200 | 0.06 | 7 | −50 | 50 | 13.0 | 12.8 | 2.2 |
| *51 | 1280 | 16200 | 0.4 | −72 | −81 | 81 | 13.1 | 12.6 | 3.0 |
| *52 | 1350 | 4500 | 0.4 | 10 | −44 | 44 | 12.8 | 12.5 | 1.5 |
| *53 | 1280 | 12700 | 2.6 | −72 | −70 | 72 | 11.1 | 8.3 | 3.5 |
| *54 | | | | Insufficiently sintered | | | | | |

As can be seen from the above results, if the molar fraction of Sr, o, is 0, like specimen No. 28, the dielectric constant becomes less than 9000, the dielectric loss exceeds 1.5% and the temperature coefficient of capacitance becomes large. If o exceeds 0.32, like specimen No. 45, the dielectric constant becomes less than 9000 and the temperature coefficient of capacitance becomes large and does not meet the requirements of F characteristics defined by JIS.

If the molar fraction of Ca, p, exceeds 0.20, like specimen No. 46, the sintering properties become worse and the dielectric constant becomes lowered.

If the molar fraction of R1, q, is 0, like specimen No. 29, the crystal grain size exceeds 3 μm, thus making it impossible to thin the dielectric layers when producing monolithic ceramic capacitors. If q exceeds 0.02, like specimen No. 47, the dielectric loss exceeds 1.5% and the insulation resistance at 25° C. or 85° C. becomes lowered.

If the molar fraction of R2, r, is 0, like specimen No. 30, the dielectric constant becomes less than 9000 and the temperature coefficient of capacitance becomes large. If r exceeds 0.03, like specimen No. 48, the dielectric loss exceeds 1.5% and the insulation resistance becomes lowered.

If the sum of the molar fractions of R1 and R2, i.e., q+r, exceeds 0.04, like specimen No. 49, the composition is reduced and semiconductorized when fired in a reducing atmosphere, whereby the insulation resistance becomes considerably lowered.

If the molar fraction of Zr, x, is 0, like specimen No. 31, the dielectric constant becomes less than 9000 and the temperature coefficient of capacitance becomes large. If x exceeds 0.24, like specimen No. 50, the sintering properties become lowered and the dielectric constant becomes less than 9000.

If the molar fraction of Hf, y, is 0, like specimen No. 32, the dielectric constant becomes less than 9000. If y exceeds 0.16, like specimen No. 51, the temperature coefficient of capacitance does not meet the requirements of F characteristics defined by JIS.

If the content of MgO is 0, like specimen No. 33, the dielectric loss is increased to more than 1.5 by the addition of R1 and R2 exceeding 0.03, and the insulation resistance becomes lowered. If the molar fraction of MgO exceeds 0.05, like specimen No. 52, the sintering properties becomes lowered and the dielectric constant becomes less than 9000.

If the molar ratio of $\{(Ba_{1-o-p-q-r}Sr_oCa_pR1_qR2_r)O_{1+q/2+r/2}\}$ to $(Ti_{1-x-y}Zr_xHf_y)O_2$, i.e., m, is less than 1.00, like specimen No. 35, the insulation resistance becomes lowered as the composition is reduced and semiconductorized when fired in a reducing atmosphere. If m exceeds 1.03, like specimen No. 54, the sintering properties becomes considerably lowered. Thus, the molar ratio of the barium site to titanium site has been limited to a value ranging from 1.000 to 1.03.

The reasons why the added amount of additives MnO, $Fe_2O_3$, $Cr_2O_3$, CoO and NiO, has been limited to the above range are as follows: If the added amount of the additive is less than 0.02 mole per 100 mole of the main component, like specimen No. 34, the insulation resistance at 85° C. and above becomes small, resulting in lowering of the reliability in a long use at high temperatures. If the added amount of the additive exceeds 2.0 moles per 100 mole of the main component, like specimen No. 53, the dielectric loss exceeds 1.5% and the insulation resistance becomes lowered.

EXAMPLE 4

Using the calcined powders of specimen Nos. 29, 30, 36 and 44 prepared in Example 3 and having particle size of not more than 1 μm, there were prepared monolithic ceramic capacitors in the same manner as Example 2.

Separate from the above, using, as raw materials, $BaCO_3$, $SrCO_3$, $CaCO_3$, $TiO_2$, $ZrO_2$, $HfO_2$, MgO, MnO and NiO with the purity of not less than 99.8%, there was prepared a calcined powder for comparative specimen No. 55 in the following manner: The raw materials were weighed and mixed so that the resultant product has a composition 9.5 mol $\{(Ba_{0.93}Sr_{0.05}Ca_{0.02})O\}_{1.01}(Ti_{0.83}Zr_{0.16}Hf_{0.01})O_2$+0.5 mol MgO+0.3 mol MnO+0.1 mol NiO. The resultant mixture of the raw materials was wet-milled with a ball mill for 16 hours, dried by evaporation, calcined in air at 1100° C. for 2 hours, and then crushed and pulverized by a dry grinding machine to prepare a calcined powder with a particle size of 1 μm or below.

Using the calcined powders, there were prepared specimens (No. 55) of monolithic ceramic capacitors in the same manner as Example 2.

The monolithic ceramic capacitors have the following dimensions and constituents:

Width: 1.6 mm
Length: 3.2 mm
Thickness: 1.2 mm
Thickness of each dielectric layer: 15 μm
Number of effective dielectric layers: 19 sheets
Surface area of internal electrode: 2.1 mm$^2$ For each specimen, electrical properties were measured in the same manner as Example 2. Results are shown in Table 7.

TABLE 7

| No. | Firing temp. (°C.) | ε | tan δ (%) | ΔC/C$_{20}$ °C. (%) −25° C. | 85° C. | CR (MΩ · μF) 25° C. | 85° C. | mean life time (h) | ΔC'/C$_0$ (%) | grain size (μm) |
|---|---|---|---|---|---|---|---|---|---|---|
| *29 | 1270 | 15100 | 4.0 | −57 | −75 | 19,800 | 12,500 | 40 | −6 | 3.9 |
| *30 | 1270 | 8800 | 7.8 | −52 | −64 | 23,300 | 17,700 | 146 | −19 | 2.0 |
| 36 | 1270 | 16800 | 3.5 | −51 | −77 | 30,400 | 16,900 | 196 | −4 | 2.3 |
| 44 | 1270 | 17900 | 4.3 | −48 | −80 | 33,600 | 19,200 | 155 | −6 | 3.0 |
| *55 | 1270 | 14900 | 4.1 | −43 | −79 | 21,100 | 13,500 | 5 | −22 | 4.1 |

As can be seen from the results shown in Table 7, the monolithic ceramic capacitors including the non-reducible dielectric ceramic composition of the present invention are high in dielectric constant, small in dielectric loss (tan δ) and possess good temperature characteristics as the temperature coefficient of capacitance (ΔC/C$_{20}$) meets requirements of F characteristics defined by JIS in the temperature range of −25° C. to +85° C. In addition, the composition of the present invention has an high insulation resistance as the product of C and R is more than 10000 MΩ.μF at 25° C. and more than 5000 MΩ.μF at 85° C. Further, the composition has a long high temperature life time of more than 100 hours and the change rate of capacitance under the high temperature load test is less than 10%.

In contrast therewith, the specimen No. 29 containing no element R1 selected from the group consisting of La, Ce, Nd is short in high temperature life time. The specimen No. 30 containing no element R2 selected from the group consisting of Dy, Ho, Er, Yb and Y is low in dielectric constant, but large in dielectric loss. In addition, the change rate of capacitance become large when the capacitor is subjected to the high temperature load test for 1000 hours.

The specimen No. 55, which does not contain R1 and R2, is short in high temperature life time, but large in change rate of capacitance. Thus, it can be seen that the co-addition of R1 and R2 contributes to improve both the high temperature life time and aging characteristics.

Although in all the examples described above, the starting materials used are powders of oxides or carbonates such as BaCO$_3$, SrCO$_3$, TiO$_2$, ZrO$_2$ and HfO$_2$, they may be powders prepared by the alkoxide method, coprecipitation method, or hydrothermal synthesis. The use of such powders has a great potential for further improvement in the electrical characteristics, as compared with those used in the above examples.

Although the present invention has been particularly described, it is to be noted that the same is by way of example only and is not to be taken by way of limitation, and the spirit and scope of the present invention is determined only by the terms of the appended claims.

What is claimed is:

1. A non-reducible dielectric ceramic composition consisting essentially of a main component and at least one oxide selected from the group consisting of oxides of Mn, Fe, Cr, Co and Ni, said main component having a composition of the general formula (I):

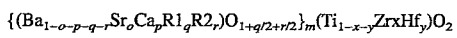

wherein R1 is at least one element selected from the group consisting of La, Ce, Nd, Pr and Sm, R2 is at least one element selected from the group consisting of Dy, Ho, Er, Yb and Y, and wherein o, p, q, r, x, y and m meet the following conditions: 0<o≦0.32, 0≦p≦0.20, 0<q≦0.02, 0< r≦0.02, 0<x≦0.24, 0<y≦0.16, 1.00≦m≦1.03, and 0<q+r≦0.03; the content of said oxide being 0.02 to 2.0 moles per 100 moles of said main component when calculated in terms of respective oxides, MnO, Fe$_2$O$_3$, Cr$_2$O$_3$, CoO and NiO.

2. A non-reducible dielectric ceramic composition consisting essentially of a main component and at least one additive selected from the group consisting of oxides of Mn, Fe, Cr, Co and Ni, said main component having a composition of the general formula (II):

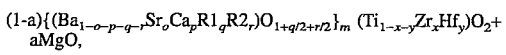

where R1 is at least one element selected from the group consisting of La, Ce, Nd, Pr and Sm, R2 is at least one element selected from the group consisting of Dy, Ho, Er, Yb and Y, and a, o, p, q, r, x, y and m meet the following conditions: 0<a≦0.05, 0<o≦0.32, 0≦p≦0.20, 0<q≦0.02, 0<r≦0.03, 0<x≦0.24, 0<y≦0.16, 1.00≦m≦1.03, and 0<q+r≦0.04; the content of said additive being 0.02 to 2.0 moles per 100 moles of said main component when calculated in terms of respective oxides, MnO, Fe$_2$O$_3$, Cr$_2$O$_3$, CoO and NiO.

3. A non-reducible dielectric ceramic composition according to claim 2, wherein o is 0.01–0.05, p is 0–0.02, q is 0.005, r is 0.003–0.005, x is 0.14–0.17, y is 0.005–0.01, m is 1.003–1.004, q+r is 0.008–0.01, a is 0.005, R1 is Ce or Sm, R2 is Dy or Er and containing 0.3–0.4 moles of MnO per 100 moles of said main component.

4. A non-reducible dielectric ceramic composition according to claim 1, wherein o is 0.02–0.14, p is 0.02–0.1, q is 0,001–0.005, r is 0,001–0.01, x is 0.01–0.16, y is 0,005–0.1, m is 1.007–1.01, q+r is 0.0075–0.021, R1 is Ce, the combination of La and Nd or the combination of La, Ce and Nd, R2 is Y, Dy, Er, the combination of Dy, Er and Y or the combination of Ho and Yb and containing 0.3–1 moles of MnO per 100 moles of said main component.

5. A non-reducible dielectric ceramic composition according to claim 1, in which o is 0.01–0.06, p is 0–0.02, q is 0.0025–0.005, r is 0.005–0,007, x is 0.15–0.13, y is 0.001–0.01, m is 1,015–1.01, q+r is 0.0075–0,012, R1 is Ce, R2 is Y, and containing 0.3–0.4 moles of MnO per 100 moles of said main component.

* * * * *